United States Patent [19]
Kajimura

[11] Patent Number: 5,166,516
[45] Date of Patent: Nov. 24, 1992

[54] SCANNING PROBE MICROSCOPE WITH SLANT DETECTION AND COMPENSATION

[75] Inventor: Hiroshi Kajimura, Tokyo, Japan

[73] Assignee: Olympus Optical Co., Ltd., Tokyo, Japan

[21] Appl. No.: 780,017

[22] Filed: Oct. 21, 1991

[30] Foreign Application Priority Data

Oct. 26, 1990 [JP] Japan .................................. 2-286985

[51] Int. Cl.$^5$ .............................................. H01J 3/14
[52] U.S. Cl. ..................................... 250/234; 250/307
[58] Field of Search ..................... 250/306, 307, 201.1, 250/561, 234

[56] References Cited

U.S. PATENT DOCUMENTS 5,103,095 4/1992 Elings et al. .................. 250/306

OTHER PUBLICATIONS

Appl. Phys. Lett. 53(12), Sep. 19, 1988, "Novel Optical Approach to Atomic Force Microscopy".
J. Vac. Sci. Technol. A8(1), Jan/Feb. 1990 "Microfabrication of Integrated Scanning Tunneling Microscope".
Appl. Phys. Lett. 57(3), Jul. 16, 1990, "Improved Atomic Force Microscope Images Using Microcantilevers With Sharp Tips".
Physical Review Letters, Atomic Force Microscope, vol. 56, No. 9, Mar. 3, 1986, G. Binnig et al., pp. 930-933.

Primary Examiner—David C. Nelms
Attorney, Agent, or Firm—Frishauf, Holtz, Goodman & Woodward

[57] ABSTRACT

A scanning probe microscope comprises a probe supported by a cantilever at the end portion. The cantilever elastically deforms by force acting on the probe. During the probe is scanned along the sample surface, a displacement of the probe along a z-axis perpendicular to the sample surface and a slant of the probe with respect to the z-axis is detected by an optical system. The optical system includes a light source, a reflection surface provided on the end of the cantilever and an optical element having first through forth light receiving regions. A light beam from the light source is directed to and reflected on the reflection surface, the beam from the reflection surface is directed on the light receiving regions. The microscope further comprises a servo circuit for controlling the displacement and the slant of the cantilever to keep them constant in response to signals S$\delta$ and S$\theta$ respectively, the signal SD being a difference signal between the sum of the outputs from the first and second light receiving regions and the sum of the outputs from the third and fourth light receiving regions, and the S$\theta$ being a difference signal between the sum of outputs from the first and third light receiving regions and the sum of outputs from the second and fourth light receiving regions.

6 Claims, 6 Drawing Sheets

SCANNING PROBE MICROSCOPE WITH SLANT DETECTION AND COMPENSATION

BACKGROUND OF THE INVENTION

1. Field of the Invention

The present invention relates to a probe microscope for observing a fine surface configuration of a sample by use of a probe, and more particularly to a force microscope such as an atomic force microscope or a magnetic force microscope which utilizes an inter-atomic force or magnetic force acting between a sample and a probe.

2. Description of the Related Art

One of apparatuses capable of observing a surface configuration of an insulating sample in the atomic order is an atomic force microscope (AFM) which is described in detail, for example, in "G. Binnig, C. F. Quate, "Atomic Force Microscope", Physical Review Letters, Vol. 56, 930 (1986). When a pointed probe is approached towards the surface of a sample (hereinafter referred to as "sample surface"), an attractive force due to van der Waals mutual effect is generated between an atom at the tip of the probe (hereinafter referred to as "probe tip atom") and an atom on the sample surface (hereinafter "sample surface atom"). If the probe is further approached to the sample surface and the distance between the probe tip atom and the sample surface atom is decreased substantially to a bond distance, a repulsive force based on the Pauli exclusion principle acts therebetween. The attractive force and repulsive force are generally called "atomic force", and the magnitude of the atomic force is very is very low, e.g. about $10^{-19}$ to $10^{-12}$ [N]. The atomic force microscope observes the sample surface configuration by utilizing the atomic force. The atomic force microscope will now be described in brief. In this microscope, a probe is attached to a soft cantilever. The probe is approached to the sample until an atomic force acts between the probe tip atom and sample surface atom and the cantilever is bent to some extent. In this state, the probe is moved along the sample surface. When the distance between the probe and sample varies in accordance with the sample surface configuration, the amount of displacement of the cantilever also varies. The distance between the probe and the sample is controlled by using a fine movement element such as a piezoelectric element, so as to restore the amount of displacement of the cantilever to an initial value. While the sample surface is raster-scanned, the control of the distance is carried out so that the locus of the probe tip describes a curved plane representing the sample surface configuration. Thus, an image of the sample surface configuration can be obtained on the basis of positional data of the probe tip.

On the other hand, the magnetic force microscope (MFM) is designed to observe the surface configuration of a magnetic material (sample). The structure of the MFM is identical to that of the above-described AFM except that magnetic force is utilized in place of atomic force. In other words, the basic structure of the MFM differs from that of the AFM in that the probe of the MFM is formed of a magnetic material. The method of observation is common between the MFM and the AFM. The probe is moved along the sample surface with a magnetic force kept constant between the probe and a magnetic particle of the sample, thereby obtaining an image of the sample surface configuration on the basis of positional data of the probe tip.

In the AFM and MFM, the sample surface configuration is measured by moving the probe relative to the sample surface in x- and y-directions, with the distance between the probe and the sample kept constant. The probe is (servo) controlled by moving the probe in a z-direction perpendicular to the sample surface by using, for example, a fine movement element such as a piezoelectric element.

Figure 10:
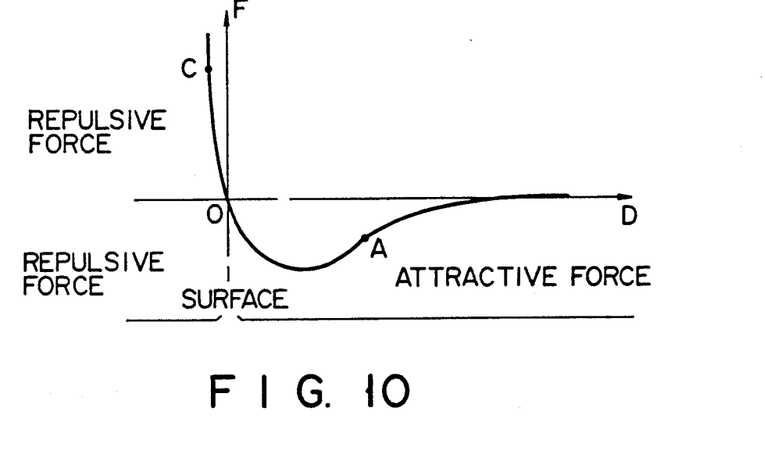
FIG. 10 is a graph showing the relationship between the probe - sample distance and the atomic force acting between the probe and sample.
Figure 11:
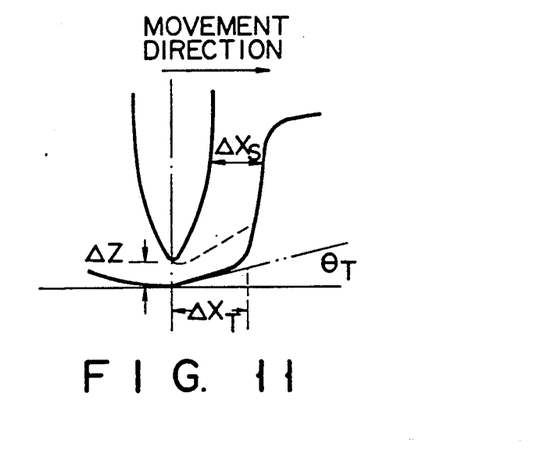
FIG. 11 shows the relationship in position between the probe and a steep surface portion.

FIG. 10 shows a general relationship between the force and the distance between the probe tip atom and the sample surface atom in the case where the probe approaches the field in which the atomic force or physical/chemical adsorption force due to atoms/molecules near the sample surface is generated. For example, when the distance between the probe and the sample is servo-controlled to a constant value so as to keep the attractive force at point A (in FIG. 10) constant, the probe does not collide with oxide film or dust on the sample, even if it exists, as far as the distance between the probe and oxide film (or dust) on the sample is exactly servo-controlled.

Both in the AFM and MFM, the distance between the probe and the sample is servo-controlled and kept constant while the sample surface is scanned by the probe (in x- and y-directions). The probe is moved in the x- and y-directions while it is moved in the z-direction so as to keep the distance Az between the probe and sample constant. In this case, if a steep surface portion (upwardly inclined portion) and the probe moves towards it, the probe would collide with it. The reason for this is that the gradient $\theta_T$ of the sample near the probe tip is gentle and the distance $\Delta X_T$ over which the probe moves while rising in response to the servo control is greater than the distance $\Delta X_S$ between the side surface of the probe and the steep surface of the sample. In particular, where the gradient $\theta_T$ is zero or less, the collision of the probe with the steep surface is inevitable. In the case where there is a downwardly inclined steep surface portion, the same problem occurs.

SUMMARY OF THE INVENTION

The object of the invention is to provide a scanning probe microscope capable of preventing a probe from colliding with a sample when the probe moves towards a steep surface portion of the sample while scanning the surface of the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of a scanning probe microscope according to the present invention will now be described with reference to the accompanying drawings.

Figure 1:
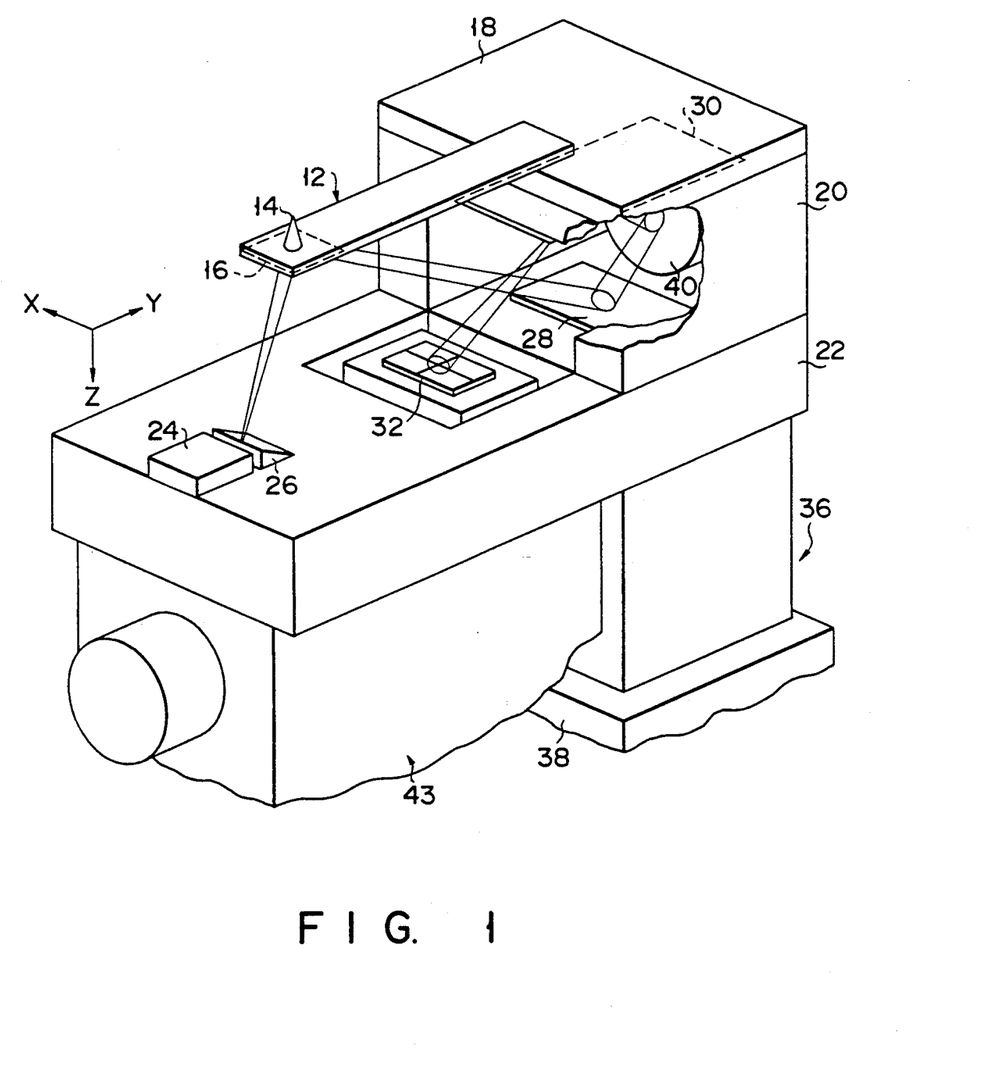
FIG. 1 shows the structure of a scanning probe microscope according to an embodiment of the present invention.

As is shown in FIG. 1, a one end portion of a cantilever 12 is fixed to an upper silicon substrate 18. A probe 14 is provided on an upper surface of a free end portion of the cantilever 12. A reflection mirror 16 is provided on a lower surface of the free end portion of the cantilever 12. The upper silicon substrate 18 is secured to a lower silicon substrate 22 with a U-cross sectional intermediate block 20 of, e.g. Pyrex glass interposed. A semiconductor laser 24 formed by a semiconductor process is provided on the lower silicon substrate 22. The semiconductor laser 24 is coupled to a waveguide 26 having at one end a Bragg reflection element or a prism. A laser beam generated by the semiconductor laser 24 is emitted from the waveguide 26 at a predetermined angle to the silicon substrate 22. The Bragg reflection element can be formed on the silicon substrate 22, for example, by repeating deposition and etching steps. The laser beam emitted from the waveguide 26 is reflected by the reflection mirror 16 on the cantilever 12. Subsequently, the beam is reflected successively by a first reflection surface 28 on the lower silicon substrate 22, a rotary mirror 40 rotatable about a y-axis, and a second reflection surface 30 provided on the intermediate block 20. Finally, the beam is made incident on a light receiver 30 on the lower silicon substrate 22.

Figure 2:
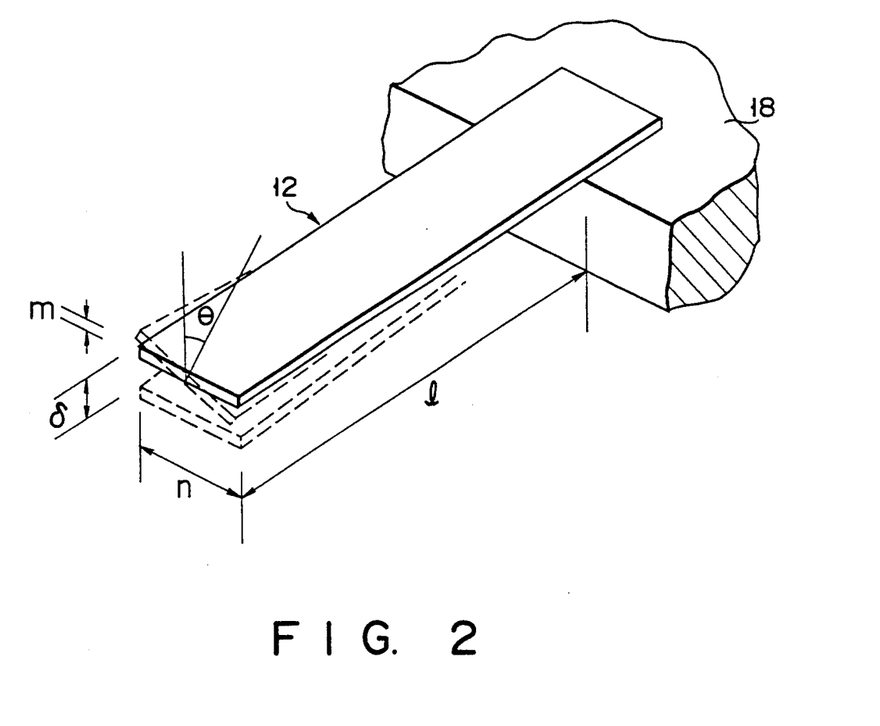
FIG. 2 shows the state in which the cantilever of FIG. 1 is displaced and the state in which it is twisted.
Figure 3:
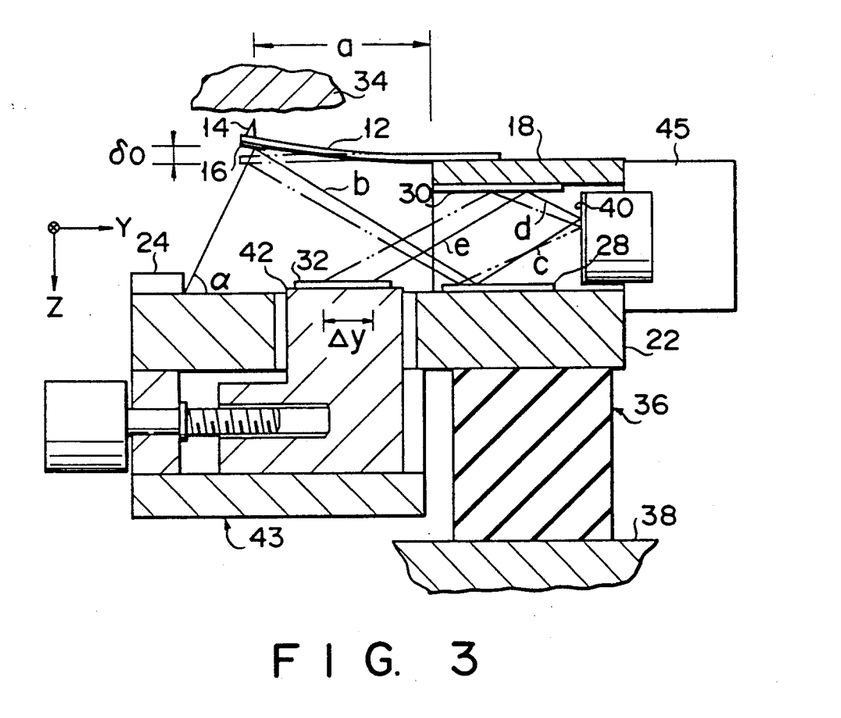
FIG. 3 shows the state in which the cantilever of FIG. 1 is displaced owing to an atomic force.

As is shown in FIGS. 2 and 3, the displacement δ of a tip portion of the cantilever 12, when a force F is exerted on the cantilever 12, is given by $$\delta = 4l^3 F / mn^3 E \quad (1)$$

where l is the length of the cantilever 12, m is the thickness of the cantilever, n is the width of the cantilever, and E is a vertical elastic coefficient of the cantilever.

When the cantilever 12 is displaced by δ, the position of the main component of the laser beam radiated on the light receiver 32 is shifted by Δy accordingly. Suppose that a denotes a distance between the proximal end of the cantilever 12 and the probe 14 on the cantilever 12; b denotes a distance (light passage length in a y-z plane) between the reflection mirror 16 and the first reflection surface 28; c denotes a distance between the first reflection mirror 28 and the rotary mirror 40; d denotes a distance between the rotary mirror 40 and the second reflection surface 30; and e denotes a distance between the second reflection surface 30 and the light receiver 32. The following relationship is established between the amount Δy of movement and distances a, b, c, d and e:

$$\Delta y \Delta 67 \, (a+b+c+d)/a$$

On the other hand, the rotational angle θ of the cantilever 12, when it receives a moment load T, is given by $$\theta = 3lT/mn^3 G \quad (2)$$

where G = a lateral elastic coefficient of the cantilever 12.

Figure 4:
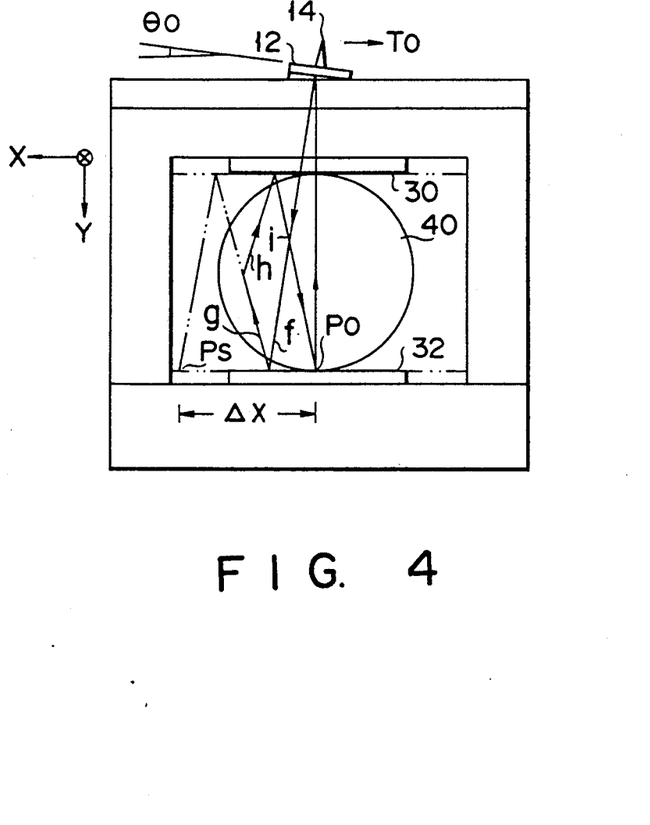
FIG. 4 shows the state in which the cantilever of FIG. 1 is twisted owing to a shearing force.

When the cantilever 12 is rotated by θ, the position of the main component of the laser beam radiated on the light receiver 32 is shifted by Δx in the case where the rotary mirror 40 is parallel to a x-z plane. In FIG. 4, the distance Δx is shown as a distance between a point Ps obtained by extending a light line g, as indicated by a two-dot-and-dash line, and an original point Po. The distance Δx of movement is given by $$A = (f+g+h+i)\sin 2\theta$$

where f denotes a distance (light passage length in a x-z plane) between the reflection mirror 16 and the first reflection plane 28; g denotes a distance between the first reflection plane 28 and the rotary mirror 40; h denotes a distance between the rotary mirror 40 to the second reflection surface 30; and i denotes a distance between the second reflection surface 30 and the light receiver 32.

Figure 5:
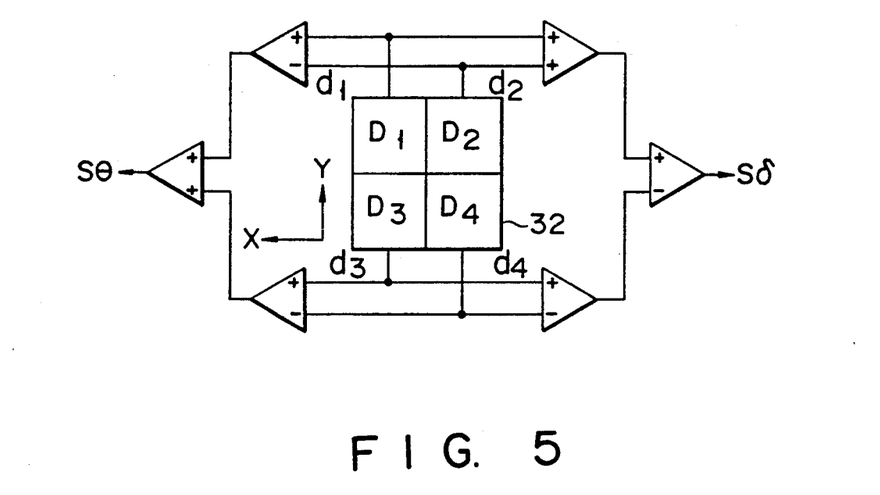
FIG. 5 shows a light receiver and its peripheral circuits for detecting a displacement and a rotational (twist) angle of the cantilever.

The distances Δx and Δy of movement are detected by use of the light receiver 32. FIG. 5 shows the structure of a detection circuit (including light receiver 32 and its peripheral circuits) for detecting these distances. Conventional adders and subtracters are combined, and the light receiver 32 comprises four light receiving components D1, D2, D3 and D4. Output signal Sδ and Sθ from the detection circuit are represented by the following equations (3) and (4) when outputs d1, d2, d3 and d4 are generated from the light receiving components D1, D2, D3 and D4:

$$S\delta = (d1+d2) - (d3+d4) \quad (3)$$

$$S\theta = (d1-d2) - (d3-d4) \quad (4)$$

The output signal SΔ and Sθ are proportional to distances Δy and Δx. Thus, the displacement δ and rotational angle θ of the cantilever 12 are found from signals Sδ and Sθ.

The lower silicon substrate 22 is fixed to a rough movement device 38 via a piezoelectric actuator 36. The piezoelectric actuator 36 is a conventional z-directional fine movement device used in an STM, etc. A fine movement device 43 with a movement amount detection encoder is mounted on the lower silicon substrate 22. The device 43 has a stage 42 movable in the y-direction. The light receiver 32 is fixed on the stage 42 which is substantially on a level with the upper surface of the lower silicon substrate 22. The rotary mirror 40 arranged in a light passage of laser beam emitted from the semiconductor laser 24 has a reflection surface slightly inclined to a plane perpendicular to the y-axis. The rotary mirror 40 can be rotated about the y-axis by a rotational actuator 45 with an angle encoder.

Figure 6:
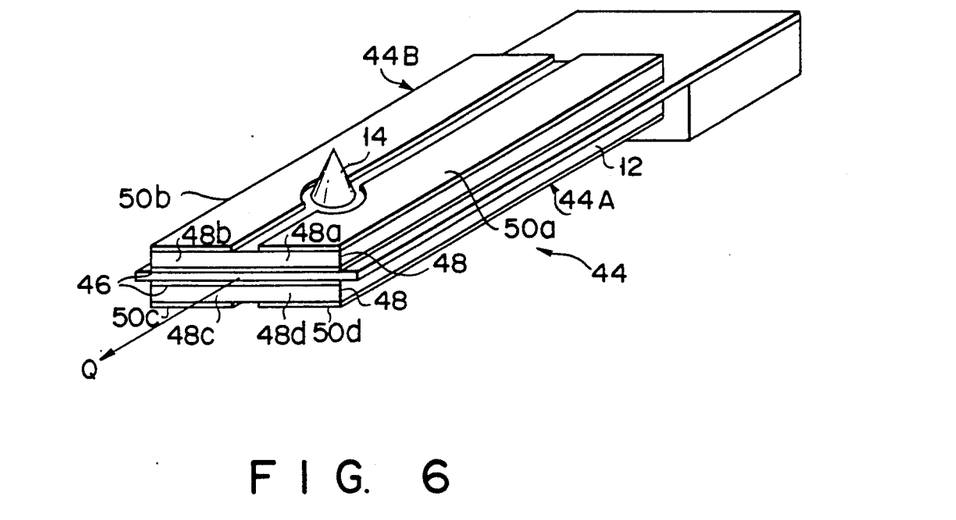
FIG. 6 is a perspective view showing in detail the structure of the cantilever of FIG. 1.

As is shown in FIG. 6, the cantilever 12 has a bimorph actuator 44 comprising two bimorphs 44A and 44B extending in the longitudinal direction of the cantilever 12. This type of bimorphs 44A and 44B were disclosed by C. F. Quate of the Stanford University, et al. These bimorphs were built in an STM cantilever. The structure and function of the bimorphs 44A and 44B will now be described with reference to FIG. 6. Al electrodes 46 for grounding are formed on the upper and lower surfaces of the cantilever 12. Piezoelectric layers 48 of ZnO, etc. are deposited on the upper and lower surfaces of the electrodes 46. Al electrodes 50a and 50b, which are separated along the center axis of the cantilever 12, are deposited on the upper surface of the upper piezoelectric layer 48; similarly, Al electrodes 50c and 50c are deposited on the lower surface of the lower piezoelectric layer 48. One bimorph 44A is constituted in the section sandwiched between the electrodes 50a and 50d, and another bimorph 44B is constituted in the section sandwiched between the electrodes 50b and 50c.

The piezoelectric layers 48 include piezoelectric portions 48a, 48b, 48c and 48d covered by the electrodes 50a, 50b, 50c and 50d. The piezoelectric portions 48a, 48b, 48c and 48d have lengths la, lb, lc and ld. When voltages V1, V2, V1 and V2 (V1>V2) are applied respectively to the electrodes 50a, 50b, 50c and 50d, the lengths of the respective piezoelectric portions are determined to be la=lc>lb=ld. As a result, the bimorph 44A is bent downwards, the bimorph 44B is bent upwards, and the tip portion of the cantilever 12 is rotated clockwise (CW) about the axis Q. If the magnitudes of voltages are reversed, i.e. V1<V2, the tip portion of the cantilever 12 is rotated counterclockwise (CCW).

On the other hand, voltages V1, V1, V2 and V2 (V1>V2) are applied to the electrodes 50a, 50b, 50c and 50d, the lengths of the respective piezoelectric portions are determined to be la=lb>lc=ld. As a result, the tip portion of the cantilever 12 is bent downwards. If the magnitudes of voltages are reversed, i.e. V1<V2, the tip portion of the cantilever 12 is bent upwards.

The initial setting and basic operation of the present embodiment will now be described.

Before starting observation of the sample surface configuration, the light receiver 32 and rotary mirror 40 are arranged at predetermined initial positions. Specifically, the position of the light receiver 32 is adjusted by using the fine movement device so that the distance between the probe and sample coincides with point A in FIG. 10 and $S\delta$ becomes zero when the cantilever 12 is displaced by $\delta o$. In addition, the angle of the rotary mirror 40 is adjusted by using the rotational actuator 45 so that $S\theta$ becomes zero when the probe 14 receives a shearing force To from the sample 34 and the cantilever 12 is rotated by $\theta o$. This initial adjustment is carried out by use of a predetermined scale (not shown).

In observation, the probe 14 is approached to the sample 34 by using the rough movement device 38 while the displacement signal S6 is being monitored. When $S\delta$ becomes zero, the rough movement device 38 is stopped. As a result, the attractive force corresponding to point A (in FIG. 10) acts on the probe 14 and the cantilever 12 is deformed upwards by $\delta o$.

Subsequently, the sample 34 is moved by using an xy scanning device which is digitally driven by use of a conventional pulse motor, and the scanning is effected. With respect to the z-directional movement of the probe 14, the distance between the probe 14 and sample varies in accordance with the surface configuration of the sample 34 and the atomic force acting on the probe 14 varies accordingly. Thus, the amount of displacement of the cantilever 12 varies. When the amount of displacement of the cantilever 12 varies, the position of the laser beam radiated on the light receiver 32 moves in the y-direction and departs from the initially set position; thus, $S\delta$ ($\neq 0$) is output. On the other hand, with respect to the movement of the probe 14 in the scanning direction, it is supposed that the probe 14 receives a shearing force T from the sample 34 during the scan and the rotational angle of the cantilever 12 is varied. In this case, the position of the spot of the laser beam radiated on the light receiver 32 moves in the x-direction and departs from the initially set position; thus, $S\theta$ ($\neq 0$) is output.

When the probe 14 scans the surface of the sample 34, the force based on the relationship of FIG. 10 acts between the endmost atom Jo of the probe 14 and the atom Ko of the sample 34 closest to the atom Jo. Supposing that the force acting between other atoms of the probe and sample is negligible, the initial displacement $\delta o$ of the cantilever 12 is determined. However, it is expectable that the radius of curvature $R_T$ of the curved surface of the probe having atom Jo as part of its tip portion and the radius of curvature $R_S$ of the partial surface of the sample 34 have the relationship of $R_T \approx R_S$. In this case, there are atoms (J1, K1), (J2, K2) ... corresponding to atoms Jo and Ko, and the acting force is integrated.

The adsorption force has a property of selectivity, depending on the combination of the probe atom and sample atom. That is, depending on the combination of atoms, adsorption occurs or does not occur. The scale of correlation curves of the force and distance varies depending on the combination (i.e. polarities exist) and on temperatures. Atoms may be variously arranged on the surface portion of the sample and the surface may be rough. It is also possible that gas adheres to fine holes of a porous solid substance and the probe itself adsorbs other atoms. During the scan, the probe may locally receive an asymmetric force and a shearing force from the sample in the direction of the plane of the sample, owing to the bond (covalent bond, ionic bond) of atoms of the probe surface or sample surface or defective structures of the surfaces. Thus, the integrated force produced by integration of various forces is applied from the sample to the probe, since the correlation based on the polarities (ionization, etc.) of the probe and sample and the inter-atomic distance is similar to that shown in FIG. 10.

Figure 7A:
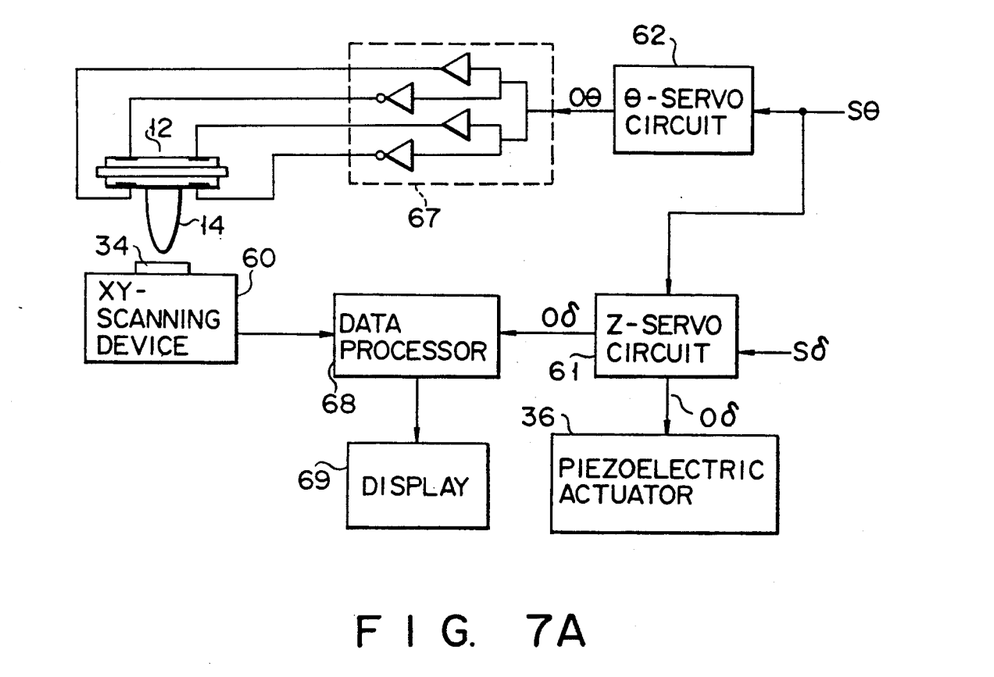
FIG. 7A shows a control unit for controlling the displacement and rotational angle of the cantilever.

Now referring to FIG. 7A, a description is given of a control unit for controlling the displacement and rotational angle of the cantilever on the basis of the displacement signal $S\delta$ and rotational angle signal $S\theta$. In measurement, the sample 34 is moved by an xy-scanning device, and the sample surface is scanned by the probe 14. During the scan, a $\theta$-servo circuit 62 outputs, in response to an input rotational angle signal $S\theta$, a $\theta$-servo signal $O\theta$ for actuating a circuit 67 for controlling the rotational angle of the cantilever, so as to keep the rotational angle of the cantilever to an initially set value. On the other hand, a z-servo circuit 61 supplies the piezoelectric actuator 36 with a voltage $O\delta$ corresponding to an input displacement signal $S\delta$, thereby keeping the distance between the probe and the sample constant. In addition to the displacement signal $S\delta$, the rotational angle signal $S\theta$ for control of an acceleration of the probe in vertical, which will be stated later in detail, is input to the z-servo circuit 61. An image of the sample surface is constructed by a data processor 68 on the basis of the data representing the xy position of the probe output from the xy-scanning device 60 and the data representing the z-position of the probe output from the z-servo circuit 61. The obtained image is shown on a display 69.

Figure 8A:
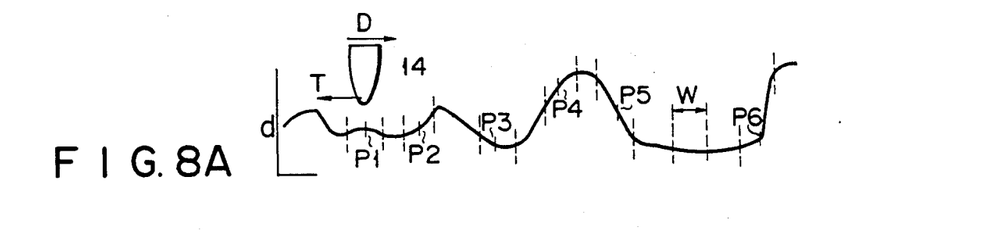
FIGS. 8A to 8E are charts for explaining the operation of the probe while the probe scans the sample surface.
Figure 8B:
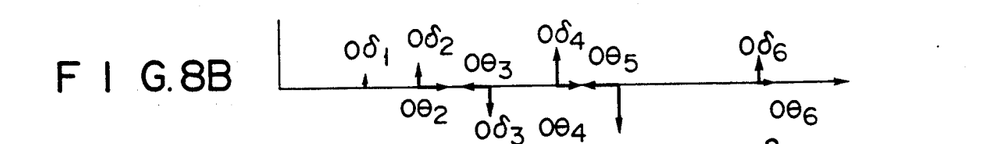
Figure 8C:
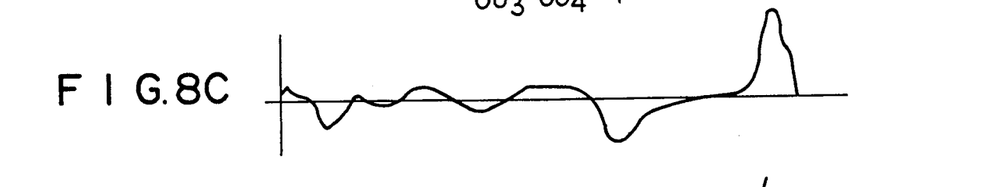

FIG. 8A shows a surface configuration d of the sample 34. The probe 14, while receiving the shearing force T, moves in the direction of arrow D over the surface configuration d. In the figure, P1, P2, P3 ... P6 indicate sample points, and the probe 14 is affected by the shearing force in the range W. In FIG. 8B, the z-servo control output at each sample point is represented by a vertical vector $O\delta_1$, $O\delta_2$, $O\delta_3$, $O\delta_4$, $O\delta_5$, $O\delta_6$, and the $\theta$-servo control output is represented by a horizontal vector $O\theta_2$, $O\theta_3$, $O\theta_4$, $O\theta_5$, $O\theta_6$. In a simple probe/sample relationship (non-polarity, etc.), the signal $S\theta$ indicating the shearing force is, as a result, similar to a curve obtained by differentiating $S\delta$, which has fast and lose phase with the probe forwarding projection and recess portion respectively, as shown in FIG. 8C.

As described above, in addition to the displacement signal $S\delta$, the signal $S\theta$ proportional to the shearing force is vectorially input to the z-servo circuit 61. Thus, when the probe approaches a convex portion on the sample during the scan, the value of the $\theta$-servo signal $O\theta$ increases and vertical movement of the probe accelerated. Consequently, the probe and the sample are separated shortly. As a result, the damage to the probe or sample caused by contact of them, which may occur because of insufficient vertical movement of the probe by the servo control using only $S\delta$, can be prevented. The $\theta$-servo signal $O\theta$ ma be input directly to the piezoelectric actuator 36.

Figure 7B:
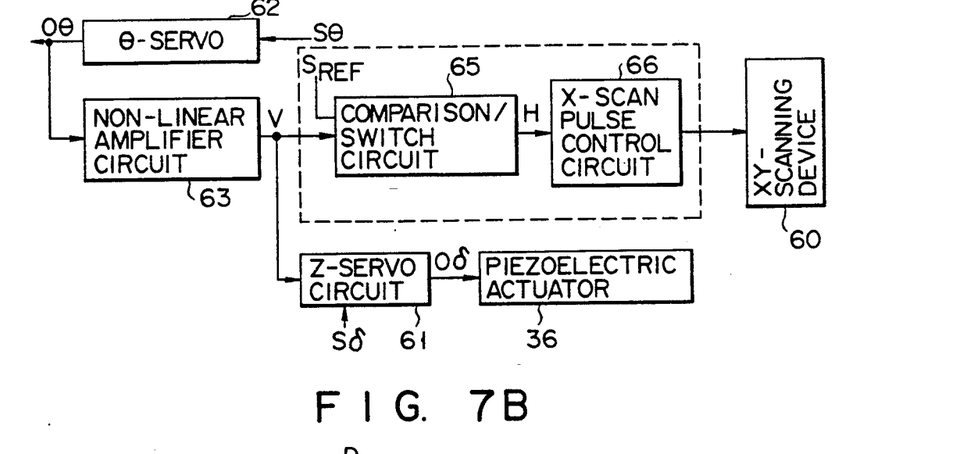
FIG. 7B shows another control unit for controlling the displacement and rotational angle of the cantilever.
Figure 8D:
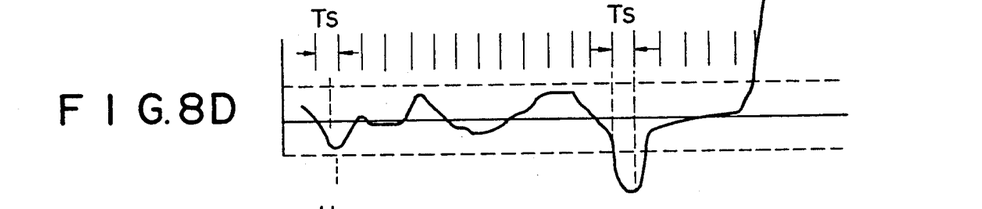
Figure 9:
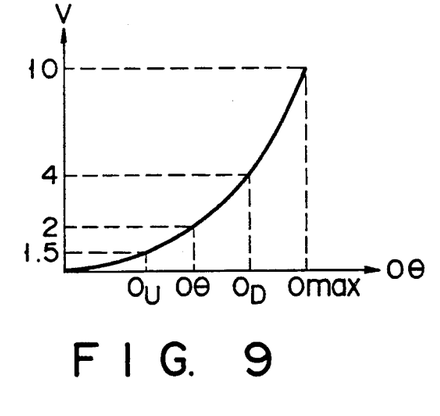
FIG. 9 is a graph showing the operational characteristics of a non-linear amplifier circuit.

Referring to FIG. 7B, another control unit for controlling the displacement and rotational angle of the cantilever will now be described with reference to FIG. 7B. This control unit has a non-linear amplifier circuit 63 for amplifying the input $\theta$-servo signal $O\theta$ and outputting the amplified signal to the z-servo circuit 61. FIG. 9 shows a $O\theta$-V curve representing the operational characteristic of the non-linear amplifier circuit 63, and FIG. 8D shows an output curve of the circuit 63. Since the z-servo circuit 61 receives the $\theta$-servo signal amplified by the non-linear amplifier 63; thus, vertical movement of the probe is accelerated at points where gradients of the sample are high. As can be seen from FIG. 9, the vertical movement of the probe is more accelerated at points where the gradients of the sample are greater.

This control unit has a comparison/switch circuit 65 and an x-scan pulse control circuit 66. On the basis of the output v from the non-linear amplifier circuit 63, the circuits 65 and 66 control the scan speed. As stated above, in the case where the signal $O\theta$ is amplified by the non-linear amplifier circuit 63 and input to the z-servo circuit 61, the responsiveness of vertical movement of the probe is highly compensated; therefore, the probe does not collide with the sample, even if the x-directional scan speed is set higher than prior art. The speed is set to meet the condition of the signal output $OU < O\theta < OD$ of the $O\theta$-v curve. However, if only the signal $O\theta (<OU)$ is obtained at a predetermined x-scan distance (condition U), the set value of the x-scan speed is too low. On the other hand, if the signal $O\theta > OD$ is obtained (condition D), the set value of the x-scan speed is too high. A reference voltage of $v = 1.5$ or $3.5$ corresponding to OU or OD is applied, where necessary, to a terminal $S_{REF}$ of the comparison/switch circuit 65. Where a signal HU corresponding to the condition U is generated, the number of scan pulses is increased to a predetermined value NU; where a signal HD corresponding to the condition D, the number of scan pulses is decreased to a predetermined value ND. The output from the x-scan pulse control circuit 66 is supplied to the xy-scanning device 60, so that the movement speed of the sample or the scan speed is adjusted. Upon receiving the output of $v = 10$ corresponding to Omax, the x-scan pulse control circuit 66 stops the pulse generation and stops the xy scanning device 60, thus preventing damage to the probe or sample and generating an alarm signal. Or, if $v = 7$ or more is abnormal, an alarm is generated based on the determination signal H of this condition and the measurement can be continued.

Figure 8E:
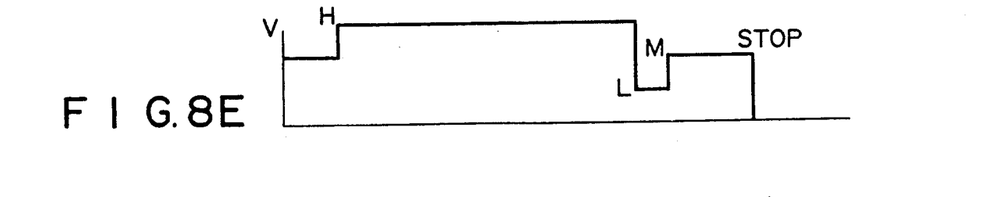

FIG. 8E is a chart illustrating the operation based on three-stage x-scan speeds with use of the determination signal H. Referring to FIG. 8E, the scan is started at a middle speed. If an output of $v < 1.5$ is not generated in a predetermined time period (sample cycle Ts), the speed is switched to a high speed $V = H$. If $v > 3.5$ is detected, the speed is lowered to L (or middle speed). If $v > 1.5$ is not generated after the time Ts during the scan, the speed is restored to the
middle speed. If $v = 10$ is detected during the scan, the scan is stopped.

In the above control unit, it is not necessarily required to provide the comparison/switch circuit 65 and the x-scan pulse control circuit 66.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A scanning probe microscope for observing a surface of a sample by using a probe, said microscope comprising:
   a pointed probe;
   a cantilever supporting said probe on one surface of a free end portion thereof, and being elastically deformable upon receiving force acting on the probe;
   scanning means for moving the probe and the sample relative to each other so that the probe scans the surface of the sample;
   detecting means for detecting the position of the probe along a z-axis perpendicular to the surface of the sample, and the slant of the probe with respect to the z-axis; and
   servo means for controlling the z-axial position of the probe on the basis of the position and slant of the probe detected by the detecting means.

2. The microscope according to claim 1, wherein said detecting means comprises:
   a reflection surface provided on the other surface of the free end portion of the cantilever;
   a light source for emitting a light beam;

radiating means for radiating the light beam on said reflection surface;

a light receiving element for receiving the light beam from the reflection surface, said light receiving element including first to fourth light receiving regions;

means for outputting a signal $S\delta$ representing the z-axial position of the probe, said signal $S\delta$ being a difference signal between the sum of the outputs from the first and second light receiving regions and the sum of the outputs from the third and fourth light receiving regions; and means for outputting a signal $S\theta$ representing the direction of the probe, said signal $S\theta$ being a difference signal between the sum of outputs from the first and third light receiving regions and the sum of outputs from the second and fourth light receiving regions.

3. The microscope according to claim 2, wherein said cantilever includes adjusting means for adjusting the direction of the probe, and said servo means includes $\theta$-servo means for outputting a signal $O\theta$ for controlling said adjusting means so as to keep the value of the signal $S\theta$ constant.

4. The microscope according to claim 3, wherein said servo means includes z-servo means for controlling the z-axial position of the probe so as to keep the value of the signal $S\delta$ constant, said z-servo means increasing the distance between the probe and the sample, irrespective of the value of the signal $S\delta$, when the value of the signal $O\theta$ exceeds a predetermined value.

5. The microscope according to claim 4, wherein said servo means includes a non-linear amplifier for amplifying the signal $O\theta$ and supplying the amplified signal to the z-servo circuit 6. The microscope according to claim 5, wherein said scanning means adjusts the movement speed of the probe relative to the sample, on the basis of the value o9 the signal $S\theta$.

* * * * *